Oct. 28, 1930.     G. BROWNING     1,779,960
THERMOSTATICALLY GOVERNED ELECTRIC LAUNDRY IRON
Filed June 17, 1929     3 Sheets-Sheet 3
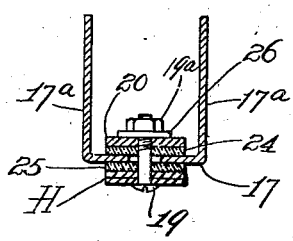
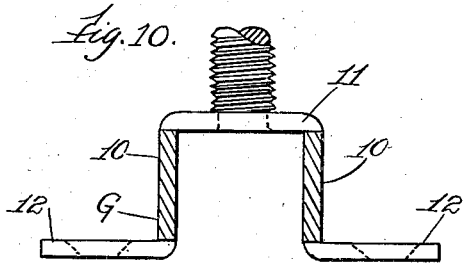
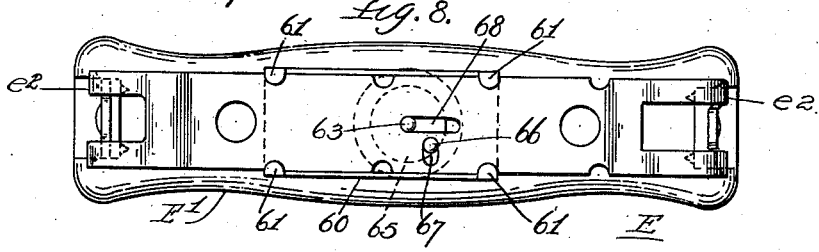
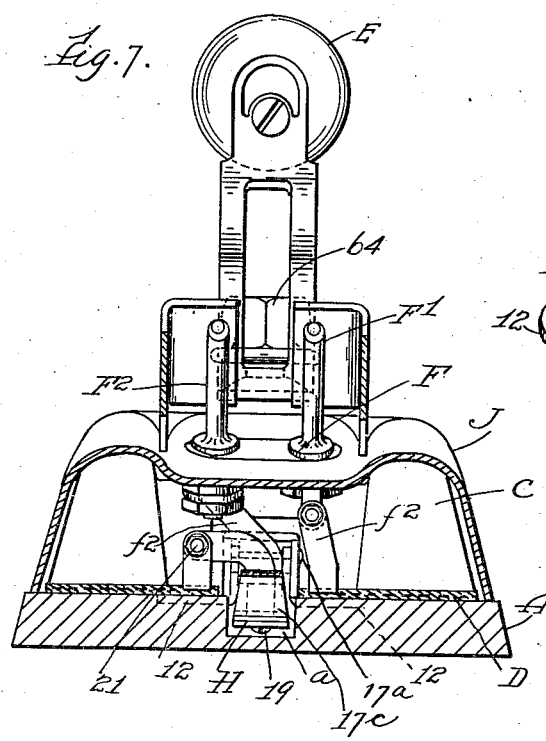
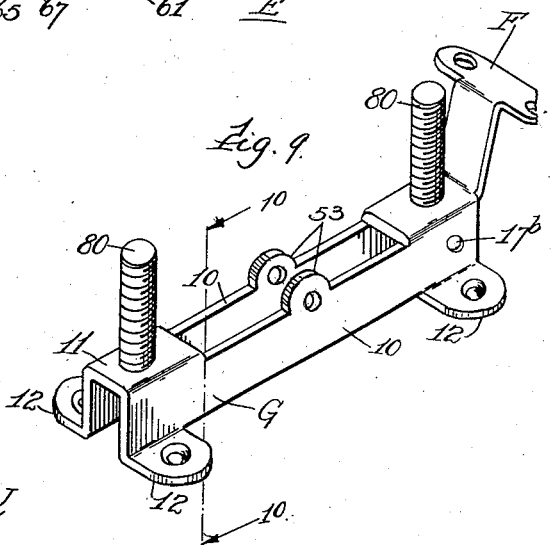
Inventor
George Browning
by Burton Burton
his Attorneys Patented Oct. 28, 1930

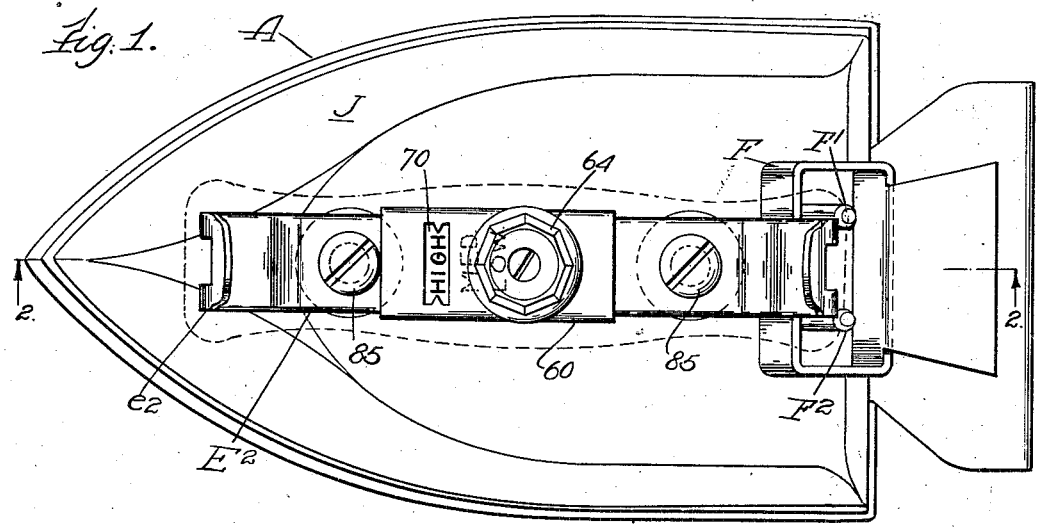
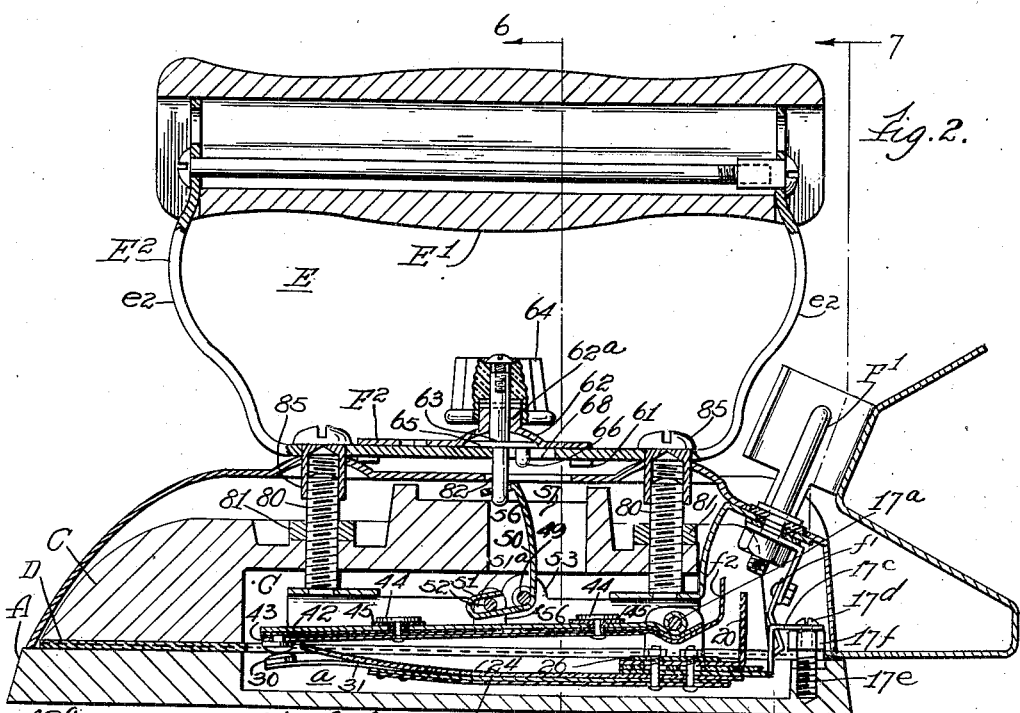

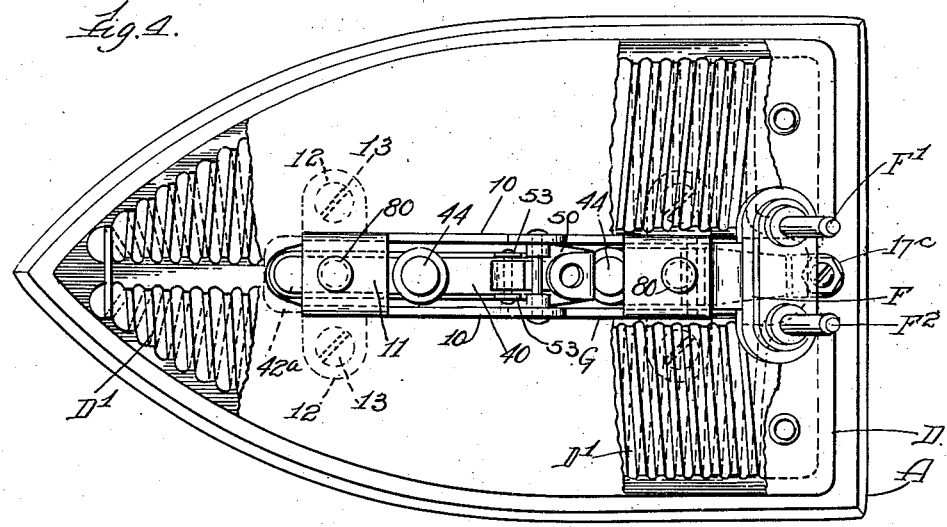
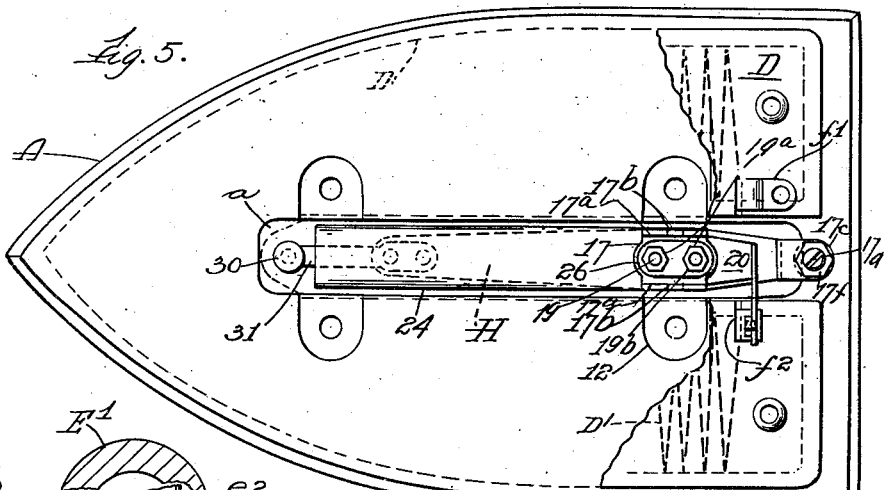
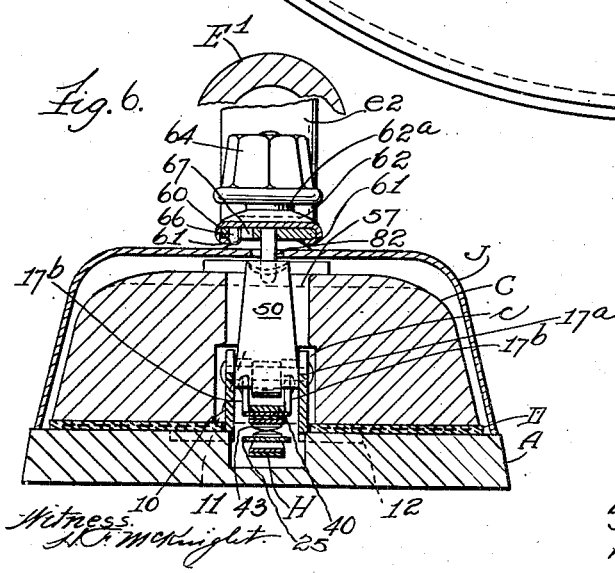

1,779,960

UNITED STATES PATENT OFFICE

GEORGE BROWNING, OF WILMETTE, ILLINOIS, ASSIGNOR TO CHICAGO FLEXIBLE SHAFT COMPANY, OF CHICAGO, ILLINOIS, A CORPORATION OF ILLINOIS

THERMOSTATICALLY-GOVERNED ELECTRIC LAUNDRY IRON

Application filed June 17, 1929. Serial No. 371,356.

The purpose of this invention is to provide an improved construction of an electric laundry iron having thermostatic devices for automatically governing the temperature of the iron by automatically interrupting the circuit by which it is energized when any predetermined temperature is obtained, and automatically restoring the circuit connection when the temperature falls below such predetermined degree, with manually accessible and operable means for adjusting the thermostatic devices to vary at will a predetermined degree of temperature at which the circuit is interrupted and restored. It consists in the elements and features of construction shown and described as indicated in the claims.

In the drawings:—

Figure 1 is a top plan view of an electric laundry iron embodying this invention, with the hand piece of the handle member removed.

Figure 2 is a section at the line 2—2 on Figure 1.

Figure 3 is a fragmentary view consisting of a part of Figure 2 showing the parts of a thermostatic regulating device in different position from that shown in Figure 2.

Figure 4 is a plan view with the handle and cover or enclosing shell and the heat storing member removed, and the upper sheath of the heating unit partly broken away to show the heating coils.

Figure 5 is a plan view with the handle and enclosing shell removed, and the heat storing member partly broken away to show the heating unit below it.

Figure 6 is a section at the line 6—6 on Figure 2, with the handle upright partly broken away to reduce the view.

Figure 7 is a section at the line 7—7 on Figure 2.

Figure 8 is a bottom plan view of the handle and certain adjustable parts carried on the handle strap.

Figure 9 is a perspective view of a frame which is mounted on the sole plate for carrying the thermostatic governing device.

Figure 10 is a section at the plane indicated by the line 10—10 on Figure 9, on an enlarged scale.

Figure 11 is a section at the line 11—11 on Figure 5, on an enlarged scale.

Referring to the drawings:—A is the sole plate,—the bottom member of the body of the iron having the working face. D is the heating unit mounted upon the upper side of the sole plate. C is a heat storage member mounted above the heating unit and serving to hold the latter tightly upon the upper surface of the sole plate. J is a cover or enclosing shell hereinafter referred to as the cover shell. E is the handle comprising a hand piece, $E^1$, and a handle strap, $E^2$, having uprights, $e^2$, at the upper end of which the hand piece is carried. A socket for holding the plug carrying the circuit wires leading to and from the source of current is seen at F. $F^1$ and $F^2$ are the plug-carrying circuit wires leading to and from the source of current as seen at F. $F^1$ and $F^2$ are the plug-engaging circuit terminal pins; $f^1$ and $f^2$ are flexible metal strips constituting initial parts of the circuit connections from the pins, $F^1$ and $F^2$, respectively, to the heating coils, $D^1$, in the heating unit, D, said connections from the strip, $f^2$, being made through thermostatically governed switch devices hereinafter described and explained.

For accommodating the thermostatic regulating devices with their several parts in proper relation respectively to the sole plate and the heat storage member, the sole plate is formed with a recess, $a$, in its upper face, and the storage member, C, is formed with a recess, $c$, in its lower face, registering with the recess, $a$, but somewhat more extended laterally than the latter. For mounting the thermostatic regulating devices in the recesses, $a$ and $c$, there is provided a frame, G, mounted upon the sole plate, overhanging the recess, $a$, of the latter, and extending up into the recess, $c$, of the storage member. This frame, G, comprises upright lateral webs, 10, extending uninterruptedly over the entire length of the frame, and connected at their upper edges by transverse webs, 11, 11, each extending for a short portion only of the length of the frame, leaving between them suitably extended openings for connections, hereinafter described, which are provided for adjusting the thermostatic regulating devices. The frame, G, is mounted on the sole plate by means of laterally projecting lugs, 12, 12, provided at the lower edges of the upright webs, 10, 10, the sole plate having in its upper surface recesses, 12ª, in which the lugs, 12, are seated, and at which they are secured to the sole plate by screws, 13, 13, screwed through said lugs into the sole plate. This frame, G, is conveniently arranged for carrying the plug socket, F, as may be understood from Figure 2.

The thermostatic devices for controlling the operation for maintaining the iron at predetermined temperature will now be described.

These devices comprise a bi-metallic bar, H, hereinafter referred to as a thermostat, said thermostat being rigidly, but adjustably, secured at one end insulatedly to the sole plate by means of a mounting fitting consisting of a U-shaped stamping, 17, having parallel limbs, 17ª, 17ª, extending inside the upright side webs, 10, 10, of the frame, G, and pivoted thereto as seen at 17ᵇ, said fitting having an arm, 17ᶜ, extended from the cross web of its U-form, said arm at a short distance from said cross web being bent first upwardly and then to the right, as seen in Figure 2, and having its extremity secured to the sole plate by being fastened by a screw, 17ᵈ, to the top of a post, 17ᵉ, which is screwed into the sole plate and adapted to be adjusted vertically by screwing it more or less into the sole plate, for which purpose it has a hexagonal head, 17ᶠ. The thermostat, H, is secured insulatedly to the fitting 17, by bolts, 19, 19, which also secure insulatedly to the thermostat fitting and conductively to the thermostat a conductive bracket 20, which is provided for connecting the thermostat conductively with the heating coil, said connection being effected by the flexible conductor $f^2$, above mentioned, leading from the coil and secured to the bracket, 20, by a binding screw, as seen at 21.

The thermostat, H, is insulated from the U-shaped fitting, 17, by means of a mica strip, 25, interposed between said fitting and the thermostat, as seen in Figure 2. The bracket, 20, is insulated from the fitting, 17, by a mica strip, 24, as seen in Figure 2, and the cross web of the U-form of the fitting, 17, has the apertures through which the bolts, 19, 19, extend enlarged for ample clearance around the bolts, so that the latter do not effect electrical conduction from the bracket, 20, to said fitting, 17.

And the bolts, 19, having their heads binding the under side of the thermostat and their nuts, 19ª, clamping a washer plate, 26, onto the upper side of the horizontal arm of the bracket, 20, constitute effective conductors for the current from the bracket, 20, to the thermostat.

The mica strip, 24, is extended along the entire length of the thermostat, and the thermostat carries at its free end a contact button, 30, at the end of a spring arm, 31, made fast at the other end to the free end of the thermostat. The purpose of this spring mounting for the contact button will be hereinafter explained.

For cooperating with the thermostat in the regulation of the temperature of the iron, there is provided a cooperating contact carrier, 40, pivotally mounted at one end in the frame, G, on the pivot pin, 17ª, said contact being carried at the end of a conducting strip, 42, mounted insulatedly on the contact carrier, said insulation being effected by a mica strip, 43, interposed between the contact carrier, 40, and the conducting strip, 42, the conducting strip being secured to the contact carrier by rivets, 44, 44, insulated from the carrier, as indicated by insulations consisting of mica washers, 45, interposed under the rivet heads, as seen in Figures 2 and 3. The conducting strip, 42, which carries the contact, 42ª, is connected in circuit with the heating coil by means of a flexible conductor shown at 46, which is clamped at one end between the insulating mica strip, 43, and the conducting strip, 42, and connected at the other end to circuit terminal pin, F², as seen in Figure 2.

For holding the cooperating contact carrier, 40, in definite position, and for adjusting it to vary the temperature limit at which the circuit is interrupted, there is provided a bell crank lever, 50, fulcrumed at its angle on a fulcrum pin, 49, mounted in oppositely positioned lugs, 53, 53, projecting up from the upper edges of the webs, 10, 10, of the frame, G, said lever having a relatively short arm, 51, extending between the webs, 10, 10, of the frame, G, longitudinally of said frame, reflexed upon itself to form a slot, 51ª, and engaging in said slot is a pin, 55, mounted in upstanding lugs, 56, 56, which are folded up from the opposite edges of the cooperating contact carrier, 40, the upstanding arm of the bell crank lever being extended up through an aperture, 57, in the heat storage member, C, and arranged at its upper end for actuation by a manually operated device which is mounted upon the handle strap, E², and projects down through said strap and through the cover shell, J, for engaging said bell crank lever, as will be hereinafter more particularly described.

Upon considering the construction as thus far described and as shown in the drawings, it may be understood that at normal atmospheric temperature which may be hereinafter referred to as "cold" the thermostat, H, is considerably flexed from straight position, substantially as seen in Figure 2, and is adapted to become straight as seen in Figure 3 when heated to the predetermined temperature limit at which the circuit is to be interrupted for preventing further rise in temperature. And it will be understood that at the position corresponding to "cold" temperature of the iron, and at any position to which the cooperating contact button, 30, is intended to be adjusted, the contact button, 42ª, is at such position that the thermostat in its normally flexed form holds the contact button, 30, in contact with the contact button, 42ª, with the spring arm, 31, flexed as seen in Figure 2 and reacting resiliently for stressing the contact button, 30, against the contact button, 42ª. And it will be recognized, therefore, that the two contact buttons will remain in contact, keeping the circuit closed and the heating unit energized until the thermostat becomes heated to a degree at which it will be straightened enough to take up the resilient action of the spring stem, 31, of the contact button, 30; and that upon becoming heated beyond this point and further straightened it will withdrawn the contact button, 30, from the contact button, 42ª, and cause the circuit to be interrupted. And it will be recognized that upon this interruption and the cooling of the iron and the thermostat which will follow upon the thermostat becoming slightly cooled will again carry the contact button, 30, into contact with the button, 42ª, closing the circuit connection and continuing the heating and maintaining the temperature of the iron to the maximum for which the adjustment is made. The result is that when the iron is in use so as to utilize the heat by radiation or conduction, the circuit will remain closed as long as the utilized heat substantially equals the heat generated by the heating unit; and that when the circuit is interrupted in the manner described by the momentary rise of the temperature beyond the predetermined degree, if the conditions of use are such as to cause continued radiation of the heat, causing the iron to become cooled below the limit, the circuit will be immediately closed, and if the heat generating capacity of the heating unit is substantially equal to the capacity of the iron for giving off heat by conduction or radiation, there will result a rapid succession of openings and closings of the circuit, with the practical effect of a continually closed circuit, with unappreciable variation of the temperature, causing the generation of the precise amount of heat utilized by loss of radiation from the iron.

Figure 3 shows the contacts, 30 and 42ª, and the thermostat at substantially straight position which may be understood to be the position and form of the thermostat at the maximum temperature. This figure may be understood as intended to show the adjusting devices set for holding the coperating contact carrier at position for medium temperature. And from this showing it may be understood that the iron has been operating at high temperature and the operator has adjusted the adjusting devices to the low or lower temperature, as "medium", thereby causing the contacts to be separated; and that they will remain thus separated until the thermostat cools down approximately to the temperature for which the adjustment is made, this cooling causing the thermostat to become flexed for carrying the contact button, 30, up into contact again with the contact button, 42ª, causing the circuit to be closed and the heating unit energized for maintaining that temperature.

It may be understood from the foregoing description that for the ordinary purposes of a laundry iron the adjusting devices will be arranged so that at the adjustment for the lowest temperature at which the iron is to be operated the circuit will be closed—that is, the buttons will be in contact—when the iron is cold, so that when the iron is connected by the plug in the usual manner with the source of current, it will begin to warm up immediately, which could not happen unless the circuit in the iron itself were closed. And in order that the circuit shall not be immediately opened by change of form of the thermostat, the spring stem, 31, of the contact, 30, at the "cold" condition must be reacting resiliently for stressing the contact, 30, against the contact, 42ª, to an extent requiring the straightening of the thermostat enough to offset and compensate that resilient reaction, by rise of temperature to said lowest temperature limit at which the iron is to be operated; and that the structure may operate in this manner is the purpose of the spring stem, 31, of the contact, 30.

Upon careful consideration of the structure it may be recognized that the principle of operation of the thermostat requires that it should be fixedly held at one end so that the change of form due to change of temperature shall cause the movement of the free end at which the contact is carried to be definite and to correspond always to the temperature change, as could not be depended upon to be the case if the other end could perform part of the movement. And it will be recognized also that the temperature at which the contacts will separate depends, to a considerable extent, on the range of the resilient action of the spring stem, 31, of the contact, 30, and the extent to which it is flexed or straightened from the normal form at the normal position of the parts as assembled at normal atmospheric temperature. And it will be recognized that the slight and unavoidable variations in the stiffness of the spring stem and in its normal form, as being straight or slightly curved, will make it extremely difficult to ensure uniformity in different irons even of the same lot, in respect to the temperature limit at which the contacts will separate at any given adjustment of the cooperating contact carrier, as at "High" or "Low". It is in view of these considerations that the thermostat is mounted as described, so that it is adjustable at its rigidly secured end by setting the threaded post, 17ᵉ, more or less deeply into the sole plate.

The manually operable adjusting devices for setting the thermostatic devices to vary the predetermined temperature limit will now be described:

These adjusting devices comprise a slide, 60, on the horizontal portion of the handle strap, said slide being mounted upon the upper side of said handle strap and having clasping lugs, 61, engaging the lateral edges of the strap as seen in Figure 2. This slide has a range of movement on the handle strap between the posts which secure it to the body of the iron, as hereinafter more particularly described, and within the range of said sliding movement the handle strap has markings indicating several degrees of temperature for which the device may be adjusted, said markings consisting, as seen in Figure 1, in the words "High", "Med." (indicating medium) and "Low"; and the slide has a reading slot, 70, through which these markings may be read at the positions respectively of the slide corresponding to the temperature indicated. The slide carries an operating stem, 63, which is mounted in a bearing, 62ᵃ, formed at the center of an up-struck hollow boss, 62, of the slide. Said stem extends down through a longitudinal slot, 68, in the handle strap and through a correspondingly positioned slot, 82, in the cover shell, J, and engages at its lower end the upper end of the upstanding arm of the bell crank, 50, as seen in Figure 2 and heretofore mentioned. The operating stem, 63, is provided at its upper end with an operating knob, 64, which is itself journaled on the bearing, 62ᵃ, for assisting in holding the operating stem accurately in the vertical position. The operating stem carries rigid with it under the hollow boss, 62, a disk, 65, having a rigidly projecting pin, 66, which engages a short transverse slot, 67, in the handle strap opposite the middle point of the length of the slot, 68, in which the operating stem, 63, moves for operating the bell crank lever, 50. Upon considering this construction it will be understood that upon rotating the handle, 64, the pin, 66, becomes a fulcrum about which said disk swings as it is rotated by the handle, the pin, 66, moving in the transverse slot a distance corresponding to the height of the segment defined by the arc of movement of the pin about the center of its rotative movement, viz., the operating stem, 62; and that accordingly with only an amount of movement of the pin transversely of the handle strap equal to the height of that segment, there is obtained longitudinal sliding movement of the slide, 60, equal to the chord of the arc of said segment, which is sufficient for shifting the slide through the entire range of movement necessary for operating the bell crank lever, 50, to effect the maximum adjustment necessary and to shift the slot, 70, from "High" to "Low" position of the temperature markings on the handle strap.

Certain specific details of the construction which are of very substantial importance from the standpoint of economical manufacturing, convenient assemblage, and rigidity of the parts for operating the iron in laundry service, will now be described.

The frame, G, which, as above described, is secured very rigidly and firmly to the sole plate, A, and carries the plug socket, F, has mounted rigidly in the transverse webs, 11, 11, upstanding threaded posts which extend through suitable apertures in the heat storage member, C, in which said posts fit snugly, and nuts, 81, 81, screwed onto said threaded posts serve to clamp the heat storage member, C, firmly down onto the heating unit, thereby clamping the latter firmly on the sole plate, A. These threaded posts, 80, 80, extend up to suitable height for serving as means of mounting the handle, which is affected by cap nuts, 85, 85, taking through suitable apertures in the handle strap which the heads of the cap nuts engage, and screwed onto the upper ends of the threaded posts as seen in Figure 2. The handle is thereby rigidly connected to the frame, G, which in turn is rigidly secured to the bottom member,—the sole plate, A,—so that all the parts are clamped together between the handle strap above and the sole plate at the bottom.

The same connections serve for securing firmly in place the cover shell, J, said cover shell being dimensioned for seating at its lower edge on the margin of the sole plate and having apertures positioned for registering with the upstanding threaded posts, 80, 80, and dimensioned for admitting the cap nuts, 85, which thus serve to clamp the handle strap down onto the cover shell, the latter being desirably formed with up-struck bosses, 85, at which the apertures are formed for admitting the cap nuts, thus serving to space the handle strap up from the general surface of the cover shell, affording clearance between the handle strap and the top of the cover shell for the clasping lugs of the slide, 60, and for the end of the pin, 66, protruding through the slot, 67.

I claim:

1. An electric laundry iron having in combination with a heating unit and a sole plate on which the heating unit is mounted for heating the plate, a sole plate having a recess in the upper side at a portion of its area which is not occupied by the heating unit; a heat storing member lodged upon the heating unit and having a recess in its lower side registered with the recess of the sole plate, a frame mounted by securement to the sole plate and extending in the vertical zone of the recess of the latter and into the recess of the heat storing member, thermostatic means mounted on said frame comprising co-operating contacts which are arranged to be separated for interrupting the circuit which energizes the heating unit, at predetermined temperature of the thermostatic member of said thermostatic devices, an operating handle for the iron, a mounting strap for the same, and mounting posts for said strap carried by said frame and extending up through the heat storing body member for securement of the handle strap thereto above said heat storing member, connections for adjusting the thermostatic devices to vary the temperature limit determined thereby, said connections extending up through the heat storing member, and manually operable means for actuating said connections mounted upon the handle strap above the same.

2. An electric laundry iron having in combination with a heating unit and a sole plate on which the heating unit is mounted for heating the plate, a sole plate having a recess in the upper side at a portion of its area which is not occupied by the heating unit; a heat storing member lodged above the heating unit having a recess in its lower side registering with the recess of the sole plate, a frame mounted by securement to the sole plate and overhanging the recess in the latter, said frame comprising lateral longitudinally extending webs and transverse web portions connecting them at the upper side of the frame; thermostatic means comprising a thermostatic element, and co-operating contact carrier carried by said frame between its said lateral longitudinally extending webs, the thermostatic element being carried by the frame depending in the recess of the sole plate, whereby it is exposed immediately to the heat of the sole plate, and the co-operating contact carrier being positioned above the plane of the heating unit, whereby it is exposed limitedly to the heat radiated by the sole plate and heat storing member, the latter having an aperture leading from said recess in its lower side through the upper side of said member; connections for operating the co-operating contact carrier of the thermostatic device extending up through said aperture, a handle having its supporting strap mounted above the heat storing member, and manually operable means mounted on said strap above the same and extending therethrough for engaging and actuating the connections which extend up through said aperture of the heat storing member.

3. An electric iron container, a base member having the working face of the iron, a heat-storing member above the base member, and a heating unit between the two members; thermostat regulating means arranged to automatically open and close the circuit at predetermined temperature, a frame mounted between the sole plate and the storage member for supporting the thermostatic device; posts extending rigidly from said frame up through the heat storage member, stops mounted on said posts above the said storage member for clamping the latter onto the base member and the heating unit, and a handle support secured to the upper end of said posts.

4. An electric iron container, a base member having the working face of the iron, a heat-storing member above the base member, and a heating unit between the two members; thermostat regulating means arranged to automatically open and close the circuit at predetermined temperature, a frame mounted between the sole plate and the storage member for supporting the thermostatic device; posts extending rigidly from said frame up through the heat storage member, stops mounted on said posts above the said storage member for clamping the latter onto the base member and the heating unit, a cover shell enclosing the heat storage member and the heating unit and stopped at its lower edge on the margin of the base member, having apertures aligned with the posts, and a handle support lodged above the cover shell having bolt holes aligned with the holes of the cover shell and nuts applied to the bolts arranged to be stopped on the handle support and thereby to clamp the latter onto the cover shell and the cover shell onto the base member in securing the handle to the posts, and thereby to the frame and also to the base member, clamping all parts of the iron firmly together.

In testimony whereof, I have hereunto set my hand at Chicago, Illinois, this 7th day of June, 1929.

GEORGE BROWNING.